April 21, 1953 S. DE ORLOW 2,635,481
BRAKE ACTUATOR
Filed Dec. 9, 1949
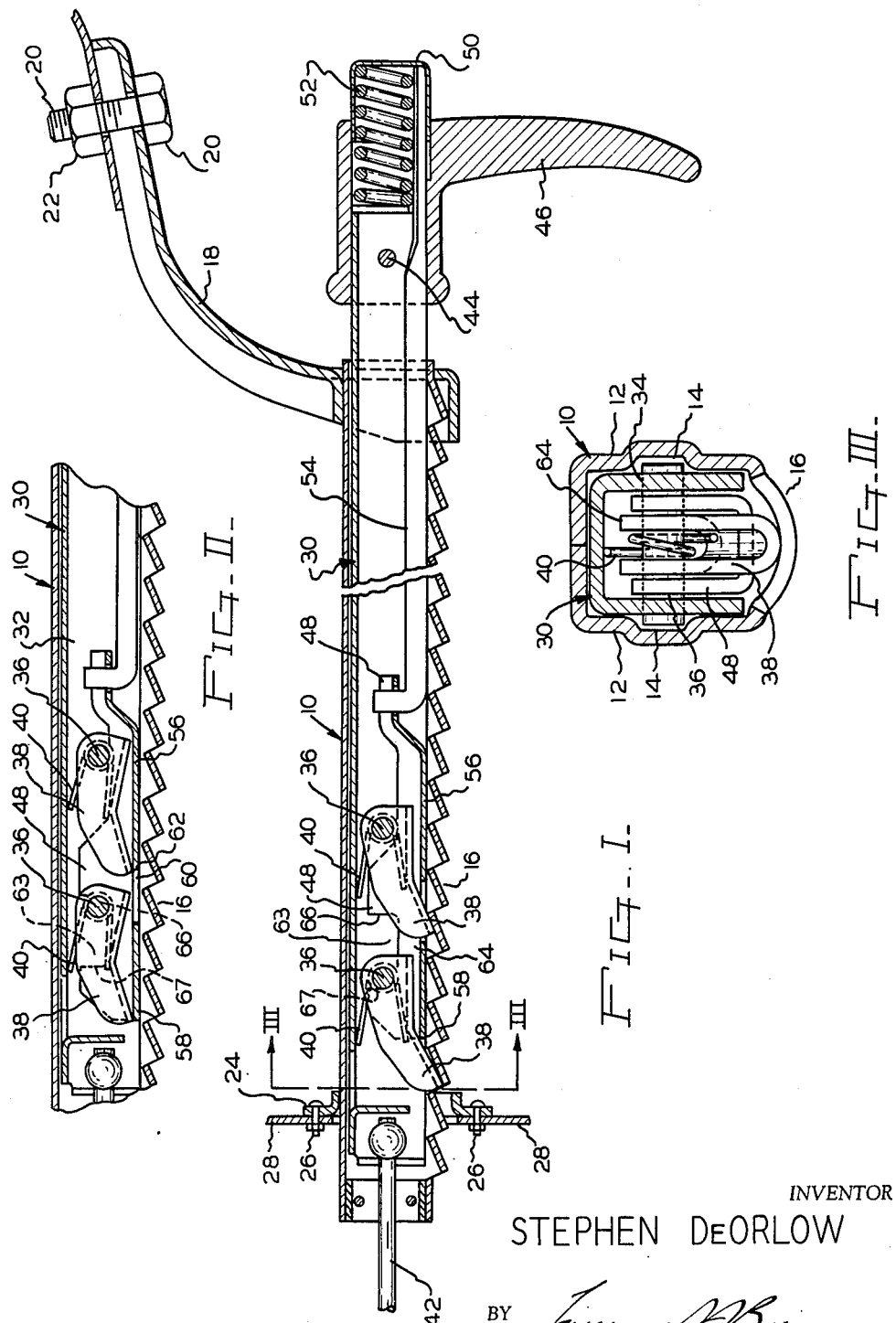
INVENTOR
STEPHEN DeORLOW
BY Laurence P. Beaman
ATTORNEY Patented Apr. 21, 1953

2,635,481

UNITED STATES PATENT OFFICE 2,635,481

BRAKE ACTUATOR

Stephen De Orlow, Jackson, Mich.

Application December 9, 1949, Serial No. 132,077

1 Claim. (Cl. 74—503)

This invention relates to push-pull ratchet and pawl control mechanism and has particular reference to mechanism of this type as employed to constitute a band operated brake control mechanism by which a vehicle may be left in a parked position.

An object of the invention is to provide a hand actuated parking brake actuator mechanism which is of simple and inexpensive construction and is capable of having its operative parts assembled in a relatively easy yet simple manner.

A further object of the invention is to provide a push-pull ratchet and pawl control mechanism, particularly a parking brake actuator mechanism, having an improved and simple pivotal mounting of the pawl means, which provides for ease of assembly and dismantling, besides giving increased and adequate bearing surface for the pivotal movement of the pawl means in use.

Another object of the invention is to provide a control mechanism of the above type having an improved construction of pawl carrier which is substantially held against the possibility of rattle due to vibration of the vehicle upon which control mechanism is mounted.

Yet another object of the invention is to provide a ratchet and pawl mechanism of the above described type having a double pawl action, which increases the number and time of locking positions for a given distance of ratchet travel and thereby increases the selectiveness of the mechanism.

The above and other objects and advantages of the invention, residing in the arrangement, construction and combination of parts will appear clear from a consideration of the following description of one practical form of the invention, given by way of example only, and with reference to the accompanying drawings and claim.

In the accompanying drawings:

Fig. I is a longitudinal section through a parking brake operating control mechanism in accordance with the invention, with the control column and enclosed parts broken away for ease of illustration, Fig. II is a detailed view of Fig. I showing the pawl actuator and keeper reciprocable slide plate structure, and Fig. III is a section on the line III—III of Fig. I on an enlarged scale.

Referring to the drawings the brake applying mechanism shown thereon comprises an elongated hollow column 10 having opposite side walls 12 with outwardly directed shallow channels 14 extending along each wall. This column is conveniently formed from sheet metal stock rolled or otherwise formed into shape, after first being subjected to a coining operation, as disclosed in U. S. Patent No. 2,153,524, granted April 4, 1939, to produce the ratchet teeth 16.

Rigid with one end of the column there is a bracket 18, which, as by the screw stud 20 and nuts 22, is capable of being secured upon the instrument panel of a vehicle to secure the control mechanism, as a whole, in operative position, with the column further secured at its opposite end, as by the flange 24 and studs 26, to the dash board 28.

Mounted for longitudinal reciprocable sliding motion in the column is a pawl carrier 30 of enlongated and channel form and having opposite side flanges 32, which have longitudinally spaced openings 34, through which pawl pivot pins 36 extend in a free sliding manner. Mounted upon these pins are pawls 38 which are spring biased, by the springs 40, into engagement with the ratchet teeth 16.

The pawls 38 engage the ratchet teeth at longitudinally spaced intervals and to a varying extent, as seen in Fig. I, so that when the one pawl is fully engaged in one ratchet tooth the other pawl is but partly engaged with another ratchet tooth. The one pawl, therefore, has a lead over the other so that it will engage the next ratchet tooth (considering the pawl carrier to be shifted to the right from the position seen in Fig. I) before the other pawl has cleared its ratchet tooth. This provides for a greater selectivity of locking positions for a given length of the ratchet column and time of travel of the pawl carrier.

The pawl carrier is connected at one end to a cable 42, in turn connected to the brake means (not shown), and at its opposite end the pawl carrier 30 is connected by the cross pin 44 to handle 46 by which the carrier can be pulled out of the column 10 to apply the brake in well known manner.

The pawls 38 are themselves also mounted in a separate carriage 48 mounted for limited reciprocation within the carrier 30 under the control of a push button 50, biased by the spring 52 and connected with a rod 54, itself connected with the pawl carriage 48.

The construction and arrangement is such that with the depressing of the push buton 50, the resultant movement of the push rod 54 and carriage 48 causes the pawls to be moved clear of the ratchet teeth and free the pawl carrier 30 to be pulled out by pulling on the handle 46 whereas release of the push button frees the ratchet to engage the ratchet teeth while leaving the carrier 30 in its extended position. The pawl carriage is conveniently a one piece pressing or stamping and is of channel section as shown with its base 56 presenting a leading edge 58, and an opening 60 in the base presenting a trailing edge 62.

The one pawl in the ratchet engaged position is maintained in engagement with the leading edge 58 by its spring 40, whereas the other pawl is maintained in engagement with the trailing edge 62 by the action of its spring 40, with this pawl engaged in the opening 60.

The side flanges 64 of the pawl carriage are cut away, as indicated at 63, to prevent edges 66 and 67 which serve to form stops engageable with the pivot pins 36 to limit the reciprocatory movement of the carriage 48, relatively to the carrier 30, under the control of the push button 50.

When the push button is depressed the base 56 of the pawl carriage rides over the pawls and depresses them into the enclosed position within the carriage, as shown in Fig. II, leaving the carrier 30 free to partake of the desired sliding motion with respect to the hollow column 10.

The carrier 30 is preferably formed with the over-all distance between its side walls somewhat in excess of the distance between the interior surfaces of the column walls 12. The construction and arrangement provides that the carrier side walls are capable of being flexed to engage the column walls with a snug sliding fit, to eliminate or minimize rattle in use.

The pawl pivot pins 36 have a free sliding fit within the openings 34 and have their ends located in the channels 14. This obviates the need for securing the pins in place, as by upsetting the ends thereof, and leaves the pins and pawl openings free to present their maximum bearing surfaces for the pivotal movement of the pawls. Considering that the pawls are subjected to continuous pivoting this is an important consideration since the maximum wear surface is provided. Further, the pawls are free to be removed and can be easily assembled. In fact the entire construction and arrangement of parts lends itself to simplicity of manufacture and assembly, yet results in a highly satisfactory and efficient pawl actuator and control assembly.

Having thus described my invention as novel and wish to secure by Letters Patent is as follows:

In a push-pull ratchet and pawl control mechanism, an elongated hollow column structure having ratchet teeth, a pawl carrier slidably mounted in said column structure, said pawl carrier being of channel formation and having openings in its side walls forming bearings for pawl pivot pin means, spring tensioned pawl means, pivot pin means loosely mounted in said openings and pivotally mounting said pawl means in the said carrier, a pawl actuator and keeper structure slidably mounted in said pawl carrier and adapted for actuation alternatively to depress said pawl means out of engagement with said ratchet teeth and to release the pawl means for engagement with said teeth, said pawl means being constituted by a pair of spaced apart pawls and said actuator and keeper structure being constituted by a reciprocable plate structure having a leading edge and an opening intermediate its ends, said opening having a trailing edge, said leading edge being located against one said pawl and the trailing edge being located opposite the other pawl, spring means associated with said pawls and biasing the one pawl into engagement with said leading edge and the other pawl into engagement with said trailing edge, said plate being slidable over said pawls to carry them out of engagement with the ratchet teeth on the column against the action of said spring means, or to release the pawls for engagement with said ratchet teeth, and stop means limiting reciprocation of said plate structure and maintaining said plate structure in continuous operative position with respect to its respective said pawls.

STEPHEN DE ORLOW.

References Cited in the file of this patent
UNITED STATES PATENTS

| Number | Name | Date |
|---|---|---|
| 1,417,674 | Lowe | May 30, 1922 |
| 1,910,300 | Marles | May 23, 1933 |
| 2,158,323 | Ericson et al. | May 16, 1939 |
| 2,177,456 | Irving | Oct. 24, 1939 |
| 2,271,799 | McCarthy | Feb. 3, 1942 |
| 2,377,691 | Jandus | June 5, 1945 |
| 2,429,224 | Furgueson et al. | Oct. 21, 1947 |